Dec. 11, 1962 H. KEINANEN ET AL 3,068,344
COMBINATION ELECTRICAL AND MECHANICAL CAN SEPARATING
MEANS ON CONTINUOUS WELDING MACHINES
Filed July 6, 1960 7 Sheets-Sheet 1

Fig.1

INVENTORS
HENRY KEINANEN &
RICHARD R. SZATKOWSKI
BY
Mason, Porter, Diller & Stewart
ATTORNEYS Dec. 11, 1962 H. KEINANEN ET AL 3,068,344
COMBINATION ELECTRICAL AND MECHANICAL CAN SEPARATING
MEANS ON CONTINUOUS WELDING MACHINES
Filed July 6, 1960 7 Sheets-Sheet 3

INVENTORS
HENRY KEINANEN &
RICHARD R. SZATKOWSKI
BY Mason, Porter, Diller & Stewart
ATTORNEYS

Dec. 11, 1962 H. KEINANEN ET AL 3,068,344
COMBINATION ELECTRICAL AND MECHANICAL CAN SEPARATING
MEANS ON CONTINUOUS WELDING MACHINES
Filed July 6, 1960 7 Sheets-Sheet 5

INVENTORS
HENRY KEINANEN &
RICHARD R. SZATKOWSKI
BY
ATTORNEYS

Dec. 11, 1962  H. KEINANEN ET AL  3,068,344
COMBINATION ELECTRICAL AND MECHANICAL CAN SEPARATING
MEANS ON CONTINUOUS WELDING MACHINES
Filed July 6, 1960  7 Sheets-Sheet 6

INVENTORS
HENRY KEINANEN &
RICHARD R. SZATKOWSKI
BY
Mason, Porter, Diller & Stewart
ATTORNEYS

INVENTORS
HENRY KEINANEN &
RICHARD R. SZATKOWSKI
BY
Mason, Porter, Diller & Stewart
ATTORNEYS United States Patent Office 3,068,344
Patented Dec. 11, 1962

3,068,344
COMBINATION ELECTRICAL AND MECHANICAL CAN SEPARATING MEANS ON CONTINUOUS WELDING MACHINES
Henry Keinanen, Oak Lawn, and Richard R. Szatkowski, Hazelcrest, Ill., assignors to Continental Can Company, Inc., New York, N.Y., a corporation of New York
Filed July 6, 1960, Ser. No. 41,053
29 Claims. (Cl. 219—68)

The invention relates in general to new and useful improvements in the art of can making, and more particularly relates to a novel means of separating a continuous welded tube into individual can bodies.

At the present time, a majority of the cans made are made by first cutting a desired shaped flat blank, after which opposite edges of the flat blank are bent to provide hooks. The blank is then shaped around a circular cross-sectional horn, with the hooks interlocked. The hooks are then bumped so as to flatten the hooks and tightly interlock the same. Then, the can body blank is passed to a soldering station where the mechanical joint formed by the hooks is reinforced and sealed by the application of solder within the seam area defined by the interlocked hooks. The can body is now completed and is ready for flanging at the opposite ends thereof for the application of can ends.

Although the present method of forming can bodies is of a nature which permits a relatively rapid production thereof, due to the numerous operations which must be performed on each can body blank and because of the reciprocating forces involved, the production speeds obtainable are less than desired. In recent years, it has been proposed to form can body blanks by first shaping and welding elongated strips into tubes, and then cutting the welded tubes into individual can body lengths. This has posed two major problems, which include the forming of the desired welded seam and the accurate and even separation of the individual can body blanks. Since the ends of the can body blanks must be straight and perfect to permit flanging and the forming of a seal between a can end and one end of the can body, the separation of the can bodies has proven to be very difficult. In the past, it has been proposed to initially slit or score the strip prior to its shaping into tube form and the welding thereof, and after the welded tube has been formed, the tube may be broken into short lengths along the slits or score lines. The complete break-off of the can body by this process is not possible since during the formation of the seam weld, a narrow high strength area is formed which cannot be readily broken. Thus, when the can bodies are broken apart along the cut or score lines, the can bodies remain interconnected by relatively narrow tabs disposed along the seam weld. These tabs must be cut in half accurately so that no part of the tab projects beyond the remainder of the end of the can body, and at the same time, there can be no recessing of the end of the can body in the vicinity of the tab since the omission of metal at this point would prevent the proper flanging and securing of a can end to the can body in sealed relation.

Many attempts have been made to accurately sever the connecting tabs between can bodies. The previous attempts have proved to be either unsatisfactory or impractical. For example, it has been proposed to utilize a flying shear for the purpose of severing the tabs. However, at the present time, the tubing from which can bodies are formed is being welded in excess of 300 feet per minute, with the expectations that this speed will be increased many times in the near future. It is virtually impossible for a flying shear to operate at this speed and to be accurately positioned each and every time with respect to the tab, particularly when it is desired that this operation be substantially continuous. In addition to the infeasibility of utilizing a flying shear, even if it were feasible to utilize one, the mechanical difficulties which would be presented, including periodic breakdown, would be of a nature to render the flying shear impractical.

Accordingly, it is the primary object of this invention to provide a novel means for severing the connecting tabs between can bodies, which means are in the form of electrical burn-off means which will operate irrespective of the spacing of tabs and which requires no synchronism between the feeding of the can bodies interconnected by tabs to produce an accurate burning off of the tabs.

The problem encountered in the electrical burnoff of connecting tabs between can bodies is the variation in widths in individual tabs due to variations in the breaking apart of the can bodies. As a result, one tab may of twice the width of an adjacent tab. If sufficient electrical current is provided to burn off the relative wide tab, when this same current is applied to the narrower tab, it will result in an excessive burning away of the tab and an arcing which will produce recesses in the ends of the can bodies preventing the proper flanging thereof and the sealing of a can end thereto. On the other hand, if only sufficient current is provided to burn off the narrowest tab, then, insufficient current will be provided to burn off the wider tabs, and thus the can bodies connected together by wide tabs will remain connected.

In accordance with this invention, it is proposed to progressively heat the connecting tabs between can bodies so that under like circumstances the narrow tab will be sufficiently heated to be severed prior to a wider tab, and in each event, the current passing through the individual tab will be insufficient to result in an excessive burning away of the tab.

Another object of the invention is to provide a centered heating system for heating and separating tabs connecting together can bodies and like tubular members, the heating system including a main conductor from which a plurality of contacting electrodes project, which contacting electrodes are spaced apart distances greater than the lengths of tabs to be severed, and at the same time, the spacing of the contacting electrodes is much less than the length of a can body, and the resistances of the conductor, the contacting electrodes, the can bodies and the connecting tabs being so related that a major portion of the current flows through the conductor and as the temperature of the connecting tab increases during the severing operation, the current flow therethrough will be decreased to prevent arcing and the undesired burning away of end portions of the can bodies as the connecting tab is severed.

Yet another object of the invention is to provide a novel apparatus for separating can bodies which have been formed as a part of a continuous tube and which are interconnected by narrow connecting tabs, the apparatus including means for electrically heating the tabs to a temperature whereby the tabs may be readily severed with the heating being progressive, and there being provided feed means for individual feeding the interconnected can bodies with the feed means being of a nature that the can bodies are urged to move faster and faster as they progress along the feed means so that tension is provided in the individual connecting tabs which, together with the heating of the tabs, will result in the severing thereof, and the feed means moving the separated can bodies away from each other after the severance of the connecting tab therebetween to prevent arcing between contacting parts of the can bodies after the severing of the connecting tab has been accomplished.

A further object of the invention is to provide a novel method of forming individual can bodies from a continuous length of tube, the method including the steps of initially breaking off can bodies from the tube with the can bodies remaining connected by relatively narrow tabs, and then progressively heating the tabs while applying a tension thereto to sever the tabs to thus completely separate the can bodies, and at the same time, retain the desired end conformation of the can bodies to permit the proper flanging thereof and the sealing of a can end thereto.

Another object of the invention is to provide novel feed means for feeding can bodies along a predetermined path with the speed of the can bodies progressively increasing as they move along the path, the feed means including a plurality of sets of feed belts, with the linear speed of each adjacent set of feed belts increasing so that as a can body passes from one set of feed belts to the next adjacent set of feed belts, the rate of movement of the can body is either increased to space it from a following can body, or a tension is applied to a connecting tab between adjacent can bodies to assist in the severing of the connecting tab.

Yet another object of the invention is to provide novel feed means for feeding can bodies, the feed means including sets of feed belts, each set of feed belts including two belts spaced apart and adapted to have a can body seated therebetween, and alternating sets of feed belts being widely and narrowly spaced, with the end portions of adjacent sets of feed belts being in overlapping relation, whereby the feed belts continuously support and feed can bodies.

Another object of the invention is to provide novel can body break-off means for breaking off can bodies from a continuous tube, which tube having been previously slitted or scored to effect the ready breaking thereof, the break-off means including suitable guide means for rigidly supporting the tube against movement from its axis, and a pair of rollers disposed adjacent the guides with the median line between the rollers being offset from the axis of the tube so that each can body portion of the tube is moved upwardly at an angle to the axis of the tube as it passes between the rollers to effect an initial separation of adjacent can bodies, and the spacing between the rollers being less than the diameter of the tube so that there is a flattening of the can bodies as they pass between the rollers to further effect the breaking apart of the can bodies along the previously formed slit or score line.

A further object of the invention is to provide novel guide and feed means for can bodies, the guide and feed means including a plurality of sets of feed belts which are disposed lowermost, and each set of which is formed of a pair of feed belts disposed in parallel relation, with the ends of adjacent pairs of feed belts being overlapped to form a continuous lower support for can bodies, and there being provided rollers cooperating with the feed belts to control the movement of the can bodies along the feed belt, the rollers including opposed rollers for engaging median portions of the can body blank, and upper rollers for engaging upper portions of the can bodies to retain the can bodies in engagement with the feed belt.

Another object of the invention is to provide a novel shunt type heater for heating and severing connecting tabs between can bodies and like tubular members, the heater including an elongated conductor in the form of a tube through which water flows to effect the cooling of the tube, the opposite ends of the tube being connected to a power supply (A.C. or D.C.) to provide the desired electrical power source, and there being mounted on the conductor tube at relatively close intervals a plurality of contacting electrodes which continuously engage can bodies as they pass along the heater to provide a shunted circuit through the can bodies and effect the heating of the connecting tabs therebetween, the contacting electrodes being in the form of laminated brushes so as to be resilient and provide the desired electrical contact with the can bodies as they move along the heater.

With the above, and other objects in view that will hereinafter appear, the nature of the invention will be more clearly understood by reference to the following detailed description, the appended claims, and the numerous views illustrated in the accompanying drawings.

Figure 1:
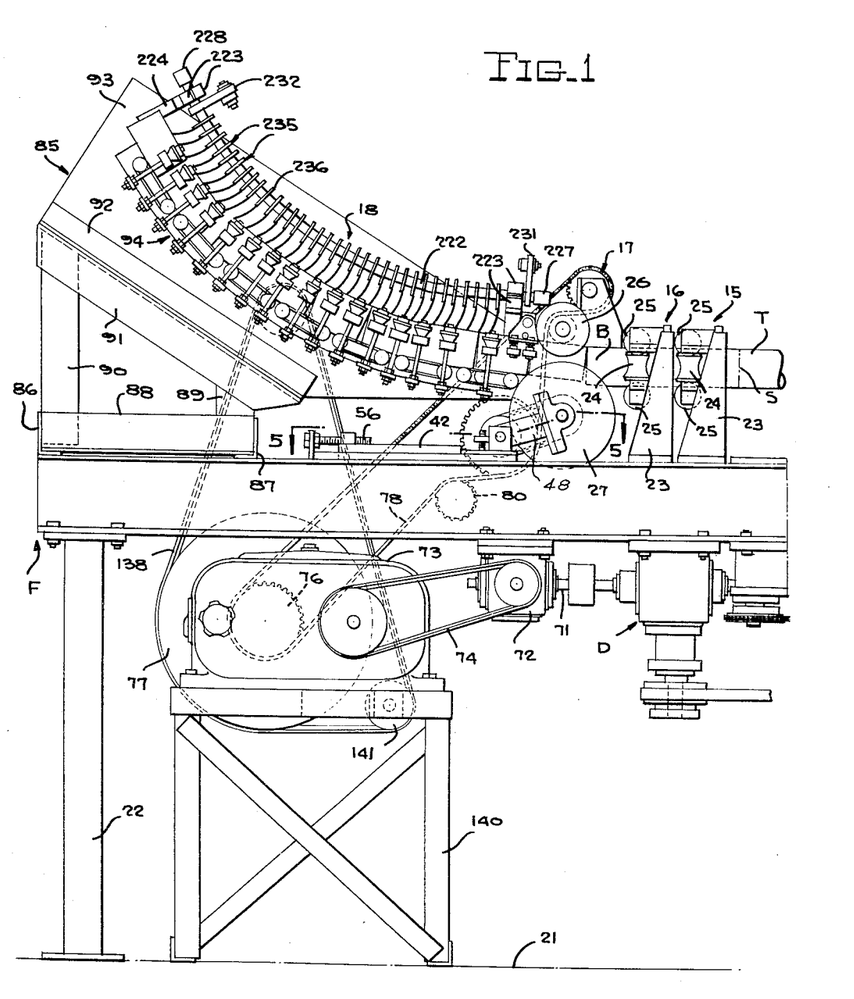
FIGURE 1 is an elevational view showing the general relationship of a previously formed tube, guide means for maintaining the movement of the tube axially thereof, means for initially breaking apart the tube into can body lengths, and means for severing the connecting tabs between the individual can body blanks.
Figure 3:
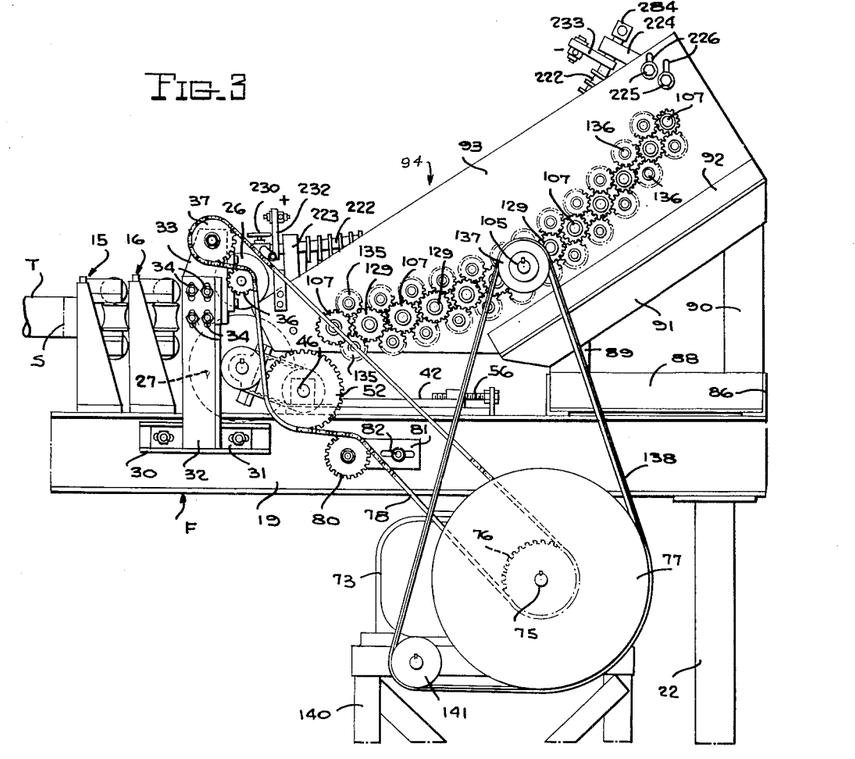
FIGURE 3 is an elevational view similar to FIGURE 1, and showing the opposite side of the apparatus of FIGURE 1, including the specific details of the drive for the means for initially breaking apart the can bodies and the means for severing the connecting tabs therebetween.

Referring now to the drawings in detail, the general arrangement of the invention is best illustrated in FIGURE 1. In accordance with the invention, a tube T has been previously formed by mechanism not a part of this application and not shown. The tube T, for descriptive purposes, is formed from a strip which has been shaped into tube form and has the edges thereof seam welded together. The tube T illustrated in FIGURE 1 has the seam weld W at the extreme top thereof. The tube T, preferably while in the strip state, is provided with transverse slit or score lines S so as to divide the tube T into individual lengths which are to be broken apart to form can bodies B. The slit or score lines S are illustrated in FIGURES 1 and 3 by dash-dot lines.

The invention is supported on a frame F which may be coextensive with the apparatus for supporting the strip in coil form, forming the strip into tube form, and welding the strip. The present invention includes a pair of tube guides, generally referred to by the numerals 15 and 16, a breaker apparatus, generally referred to by the numeral 17, for breaking the tube T along the slit or score lines S into individual can body blanks B, and a tab severing apparatus, generally referred to by the numeral 18.

Figure 6:
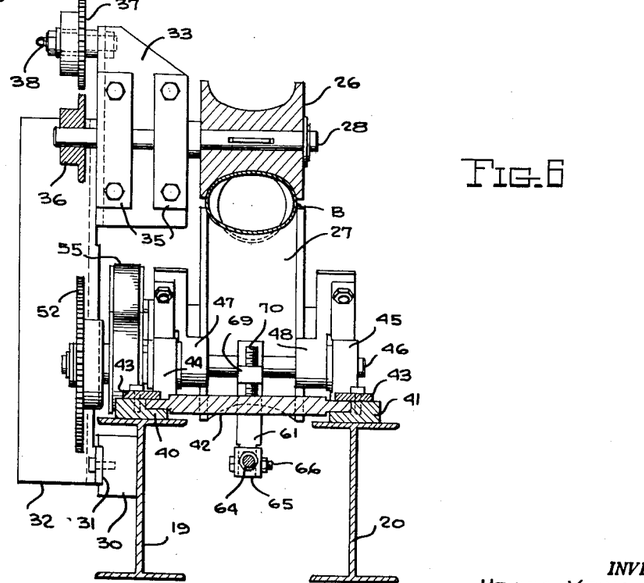
FIGURE 6 is an enlarged fragmentary vertical sectional view, taken along the line 6—6 of FIGURE 4, and shows further the specific details of the can body breaker.

The frame F is formed of a pair of longitudinal frame members 19, 20, which are best illustrated in FIGURE 6 as being in the form of I-beams. The frame members 19, 20 are supported in elevated relation with respect to a floor 21 by means of standards, such as the standards 22 of FIGURE 1.

The guides 15 and 16 are substantially identical, and each of the guides includes a frame 23 which suitably supports a pair of vertically disposed guide rollers 24, and a pair of horizontally disposed guide rollers 25. The guide rollers 24 and 25 are disposed in rectilinear relation, and are configurated to be complementary to surfaces of the tube T with which they engage. The guides 15 and 16 are disposed in alignment with each other and in alignment with the axis of the tube T, the tube T being mounted for movement longitudinally of its axis from right to left, as viewed in FIGURE 1. The means for moving the tube T have not been illustrated in that they play no part in this invention per se.

The breaker apparatus 17 includes an upper breaker roller 26 and a lower breaker roller 27. The upper breaker roller 26 is mounted on a horizontal shaft 28, and the lower beaker roller 27 is mounted on a horizontal shaft 29. The shafts 28 and 29 extend transversely of the frame F and are driven in a manner to be described in detail hereinafter.

As is best shown in FIGURES 3 and 6, the outer surface of the frame rail 19 has an elongated support block 30 secured thereto. The support block 30, in turn, has a mounting plate 31 longitudinally adjustably secured thereto. The support plate 31 is secured to an upstanding angle bracket 32 which is disposed at one side of the frame F. A second angle bracket 33 is adjustably secured to the upper part of the angle bracket 32 by means of fasteners 34 (FIGURE 3).

A pair of transversely aligned bearing units 35 are secured to the angle bracket 33 and the shaft 28 is rotatably journaled therein. The breaker roller 26 is secured to one end of the shaft 28 for rotation therewith, and a drive sprocket 36 is secured to the opposite end of the shaft 28, the bearing units 35 being disposed intermediate the drive sprocket 36 and the breaker roller 26. The angle bracket 33 also supports an idler sprocket 37 which is disposed above and in the same general vertical plane as the drive sprocket 36. The idler sprocket 37 is mounted on a stub shaft 38 carried by the angle bracket 33.

Slide plates 40 and 41 are seated on and extend longitudinally of the frame members 19 and 20, respectively. The slide plates 40, 41 are notched to receive a sliding plate 42 in the manner best illustrated in FIGURE 6. The sliding plate 42 is held against vertical movement by holddown bars 43 overlying the slide plates 40 and 41. The purpose of the sliding plate 42 will become evident hereinafter.

Figure 5:
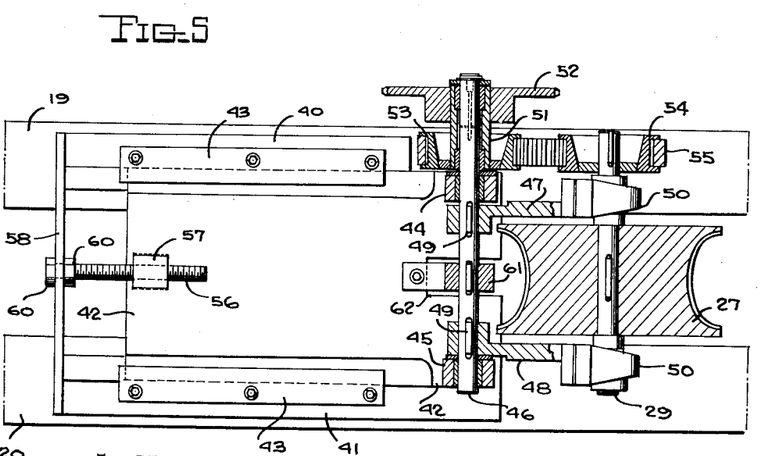
FIGURE 5 is an enlarged fragmentary horizontal sectional view, taken along the line 5—5 of FIGURE 1, and shows further the details of the mounting and adjustment of the movable breaker roller.

As is best illustrated in FIGURES 5 and 6, a pair of bearing members 44 and 45 are secured to the right end portion of the sliding plate 42 in transverse alignment. A shaft 46 is rotatably journaled within the bearing members 44, 45, and extends beyond the bearing member 44.

A pair of arms 47, 48 are keyed to the shaft 46 by keys 49 inwardly of the bearing members 44, 45, and project upwardly and generally to the right from the shaft 46, as viewed in FIGURE 1, for example. The upper ends of the arms 47, 48 carry bearing units 50 in which the shaft 29 is rotatably journaled. The breaker roller 27 is keyed on the shaft 29 between the bearing units 50.

Referring once again to FIGURE 5, it will be seen that a sleeve 51 is rotatably journaled on that portion of the shaft 46 which projects beyond the bearing member 44. A drive sprocket 52 is secured to the outer part of the sleeve 51 for rotation therewith. A drive pulley 53 is secured to the inner part of the sleeve 51 for movement in unison with the drive sprocket 52 and the sleeve 51.

A driven sprocket 54 is keyed to a portion of the shaft 29 which projects beyond one of the bearing units 50 and is disposed in alignment with the pulley 53. A cleated drive belt 55 is entrained over the pulleys 53, 54 and drivingly connects the two together. It will thus be seen that the breaker roller 27 is free to pivot about the axis of the shaft 46 to control its vertical position, and at the same time, it may be driven without requiring adjustments.

Figure 4:
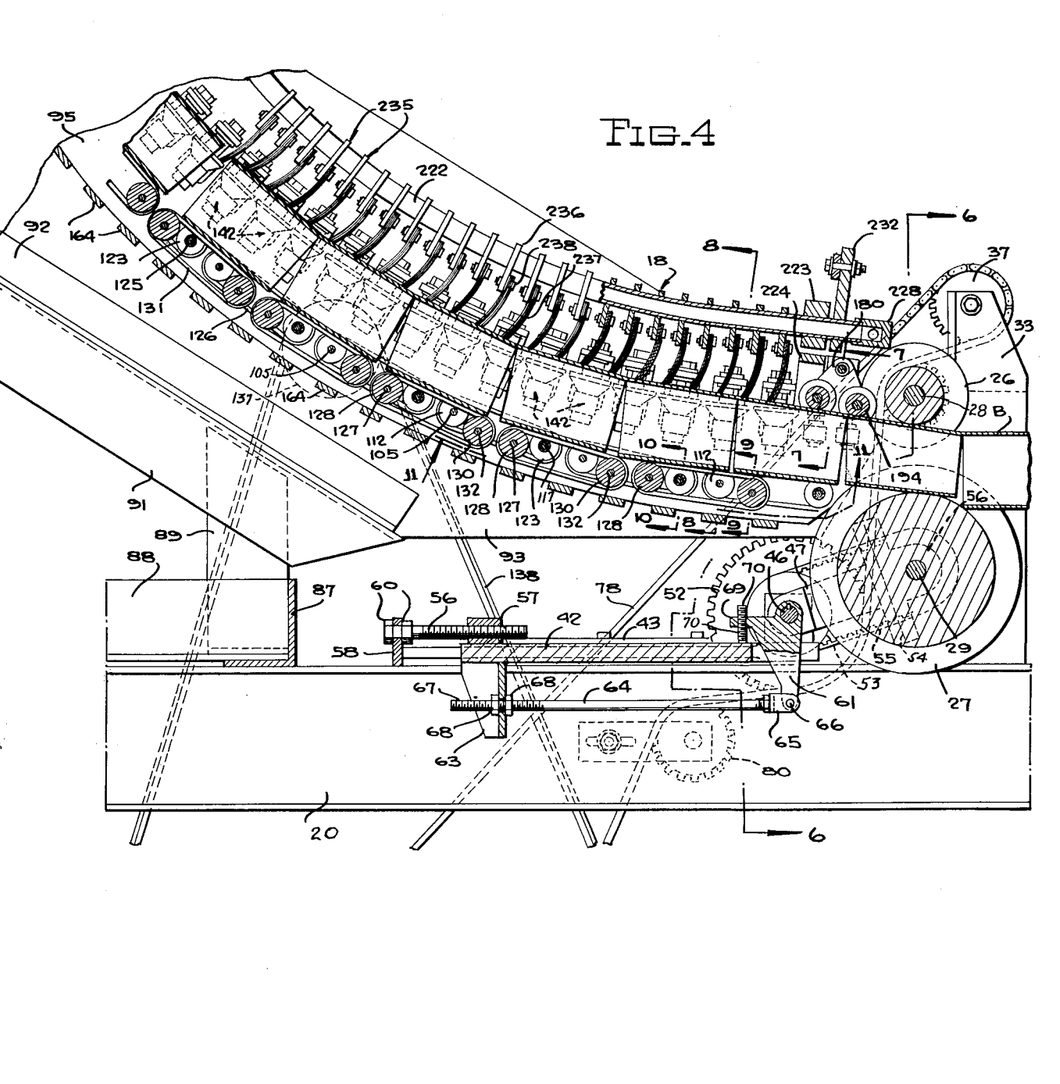
FIGURE 4 is an enlarged fragmentary vertical sectional view, taken along the line 4—4 of FIGURE 2, and shows the specific details of the can body breaker means and the connecting tab severing means, including the specific details of the means for adjusting the relative position of a movable breaker roller with respect to a fixed breaker roller.

The position of the breaker roller 27 longitudinally of the frame F is controlled by positioning the sliding plate 42. The adjustment of the sliding plate 42 is accomplished by means of a feed screw 56 which is best illustrated in FIGURE 4. The feed screw 56 is threaded in a nut member 57 which extends upwardly from the central rear part of the sliding plate 42. The feed screw is rotatably carried by an upstanding, transverse bar 58 which extends between the frame members 19, 20. Movement of the feed screw 56 longitudinally of the frame F is prevented by a double headed construction, including a pair of heads 60 disposed on opposite sides of the bar 58.

The shaft 29 and the breaker roller 27 are maintained in vertically adjusted positions by means of a crank arm 61 which is keyed to a central portion of the shaft 46, as is best shown in FIGURE 4. The crank arm 61 is seated in a notched out portion 62 of the forward part of the sliding plate 42 and depends therethrough. An angle bracket 63 depends from the lower rear part of the sliding plate 42 and carries a rod 64. The forward end of the rod 64 is provided with a bifurcated connecting fitting 65 which is pivotally connected to the crank arm 61 by a pin 66. The left portion of the rod 64 is provided with threads 67 on which a pair of nuts 68 are engaged. By adjusting the position of the nuts 68, the rod 64 may be either extended or retracted with respect to the angle bracket 63 to raise or lower the shaft 29 and the breaker roller 27.

The upper part of the crank arm 61 has a portion 69 which projects to the left, as viewed in FIGURE 4. A locking screw 70 is threaded through the portion 69 and bears against the upper surface of the sliding plate 42. The locking screw 70 cooperates with the rod 64 to prevent any rocking movement of the support for the shaft 29.

Reference is now made to FIGURE 1, for the details of the drive for the breaker apparatus 17. The machine of which the present invention is a part includes a drive unit generally referred to by D. The drive unit includes a shaft 71 which is connected to a gear box 72. The gear box 72 is, in turn, connected to a variable ratio gear box 73 by a pulley and belt assembly 74. As is best shown in FIGURE 3, the gear box 73 has an output shaft 75 on which a sprocket 76 and a pulley 77 are mounted. A drive chain 78 passes over the sprocket 76, the sprocket 52, the sprocket 36, and the sprocket 37. The drive chain 78 also passes over an idler sprocket 80 which is carried by a bracket 81 adjustably secured to the longitudinal frame member 19, as at 82. In this manner, the slack in the drive chain 78 may be controlled irrespective of the longitudinal position of the sprocket 52 within the limits of the adjustment of the sliding plate 42.

The tab severing apparatus 18 includes a supporting frame structure generally referred to by the numeral 85. The frame 85 includes a pair of transverse frame members 86 and 87 which extend transversely across the tops of the longitudinal frame members 19 and 20. A pair of longitudinally extending frame members 88 extend between and seat on the frame members 86, 87. The frame members 88 are in the form of angle members disposed in back-to-back relation. A relatively short upright 89 is disposed between the right ends of the frame members 88, and a relatively long upright 90 is disposed between the left ends of the frame members 88, as is best shown in FIGURE 1. A pair of upwardly sloping frame members 91 are secured to the upper ends of the uprights 89 and 90. The frame members 91 are also angle members disposed in generally back-to-back relation and positioned on opposite sides of the uprights 89, 90. A second pair of frame members 92 overlie the frame members 91. The frame members 92 are also in the form of angle members which are disposed in back-to-back relation with respect to the frame members 91 and in spaced back-to-back relation with respect to each other. A supporting plate 93 is disposed between and is secured to the frame members 92. A combination feed and guide assembly, generally referred to by the numeral 94, is secured to the supporting plate 93.

Figure 8:
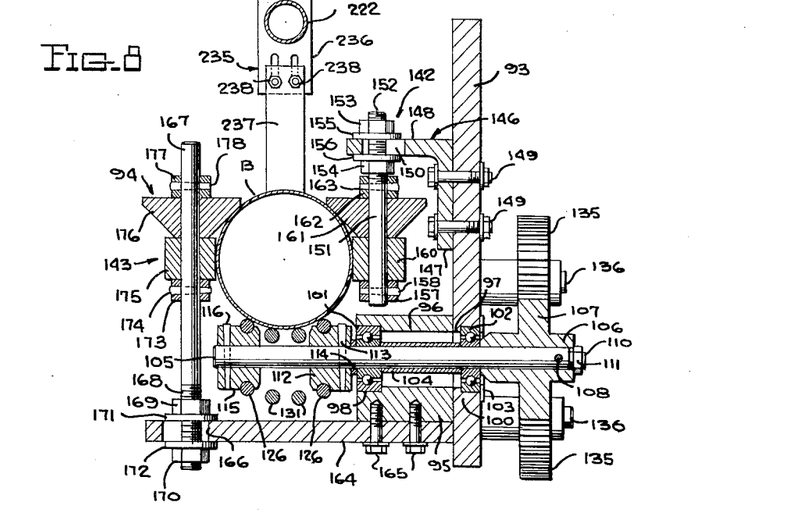
FIGURE 8 is an enlarged fragmentary vertical sectional view, taken along the line 8—8 of FIGURE 4, and shows the specific details of the means for feeding and guiding the can bodies.

The details of the feed and guide assembly 94 may be best described by referring to FIGURE 8, wherein a station thereof is illustrated. A bar 95 is suitably secured to one face of the plate 93 adjacent the lower edge thereof. The bar 95 is arcuate in elevation, and curves upwardly and to the left, as is best shown in FIGURE 4. The bar 95 generally defines the arcuate path to be followed by can bodies during the severing the tabs connecting the two together, the tabs being generally referred to by the letter *t* and shown in FIGURE 2.

At longitudinally spaced intervals along the bar 95, the bar 95 is provided with transverse bores 96. Each bore 96 has an extension 97 which opens into the plate 93. The end of the bore 96 remote from the plate 93 is enlarged, as at 98. The end of the bore extension 97 remote from the bar 95 opens into an enlarged bore 100. A ball bearing unit 101 is seated in the bore 98 and a similar ball bearing unit 102 is seated in the bore 100. The bearing 102 is held in the bore 100 by a washer 103, and the bearings 101 and 102 are spaced apart by a sleeve 104 which extends through the bore 96.

A shaft 105 extends through and is rotatably journaled in the bearing units 101 and 102. The right end of the shaft 105, as viewed in FIGURE 8, has a hub 106 of a drive gear 107 positioned thereon and secured thereto by means of a pin 108. The right end of the shaft 105 is reduced and threaded, as at 110, and has a nut 111 thereon retaining the drive gear 107 on the shaft 105.

A first pulley 112 is secured to the shaft 105 by means of a pin 113. A thrust washer 114 is disposed between the pulley 112 and the bearing unit 101. A second pulley 115 is secured on the left end of the shaft 105 by means of a pin 116. The pulleys 115 and 112 are identical, except for being left and right.

Figure 9:
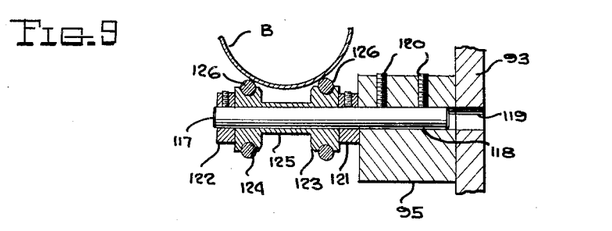
FIGURE 9 is an enlarged fragmentary vertical sectional view, taken along the line 9—9 of FIGURE 4, and shows the specific details of mounting of idler pulleys for one set of feed belts.

An axle or shaft 117 is spaced from and associated with each of the shaft 105. The shaft 117 has the right end thereof, as viewed in FIGURE 9, positioned within a bore 118 within a bar 95, which bore is aligned with a bore 119 in the plate 93. The shaft 117 is positioned within the bore 118 by means of setscrews 120. A thrust washer or collar 121 is positioned on the shaft 117 adjacent the bar 95. A second thrust washer or collar 122 is positioned on the shaft 117 remote from the bar 95. A pair of pulleys 123 and 124 are integrally connected together by an intermediate sleeve 125 and are freely rotatable on the shaft 117 between the collars 121, 122. The pulley 123 is aligned with the pulley 112 and the pulley 124 is aligned with the pulley 115.

The pulleys 112, 123, 115, 124 make up a set. A first drive belt 126 is entrained over the pulleys 112 and 123, and a second drive belt 126 is entrained over the pulleys 115 and 124. It is to be noted that the drive belts 126 are circular in cross-section and that they are disposed to engage the lower outer part of a can body B.

As is best illustrated in FIGURE 4, a shaft 127 is disposed to the left of each of the shafts 117. The shaft 127 has a multiple groove pulley 128 positioned thereon for rotation therewith. The shaft 127 corresponds to the shaft 105 and is driven through a drive gear 129 secured thereon to the right of the plate 93, as viewed in FIGURE 8.

Figure 10:
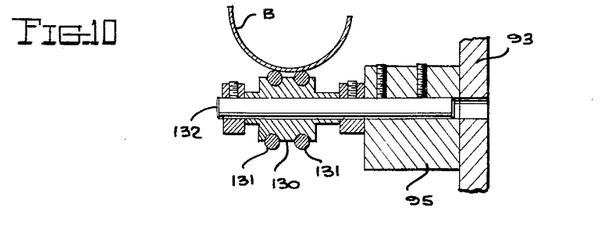
FIGURE 10 is an enlarged fragmentary vertical sectional view similar to FIGURE 9, and taken along the line 10—10 of FIGURE 4, the view showing the details of mounting of an idler pulley for a second set of feed belts.
Figure 11:
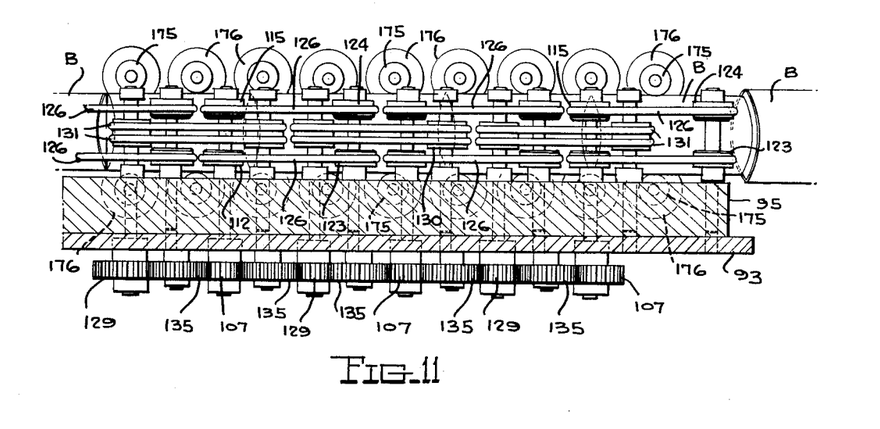
FIGURE 11 is a fragmentary, generally horizontal, sectional view, taken along the line 11—11 of FIGURE 4, and shows the general arrangement of the sets of feed belts, as viewed from the undersides thereof.

In FIGURE 10, the details of mounting for a multiple groove idler pulley 130 are shown. The pulley 130 corresponds to the pulley 128 and cooperates with the pulley 128 for supporting a pair of closely disposed drive belts 131, which drive belts are circular in cross-section and are entrained over the pulleys 128, 130. The pulley 130 is mounted on a shaft 132 for rotation, with the shaft 132 being supported from the bar 95 in the same manner as described with respect to the shaft 117.

It is to be noted that the drive belts 131 are closely spaced with respect to each other as compared to the relatively wide spacing of the drive belts 126. Thus, the drive belts 131 engage the lowermost portions of the can bodies B. It is also to be noted that the axes of the shafts 127 and 132 are vertically offset downwardly from the corresponding ones of the shafts 105 and 117 so that the various pulleys may be substantially of the same diameter and thus permit the upper runs of the belts 131 to be disposed below the upper runs of the belts 126.

Reference is now made to FIGURE 3 of the drawings, wherein the arrangement of the drive gears for the feed assembly 94 is illustrated. It is to be noted that the drive gears 107 and 129 are alternated and are disposed in spaced relation. It is also to be noted that the diameters of the drive gears 107 and 129 decrease from left to right, as viewed in FIGURE 3. Adjacent ones of the drive gears 107 and 129 are connected together by intermediate gears 135 which are arranged in pairs above and below the respective drive gears 107 and 129, and which are freely mounted for rotation on stub shafts 136 suitably supported by the plate 93. Because of the gradual decreasing in diameters of the drive gears 107 and 129, the drive belts 126 and 131 of each set thereof are progressively driven faster from right to left, as viewed in FIGURES 1 and 4. The purpose of this arrangement will be set forth in detail hereinafter.

As is best illustrated in FIGURE 3, a central one of the shafts 105 projects beyond the drive gear 107 positioned thereon and is provided with a drive pulley 137. The drive pulley 137 lies in the same plane as the pulley 77 and is connected thereto by a drive belt 138 which is entrained over the pulleys 77 and 137. The previously disclosed reduction gear unit 73 is positioned on a stand 140. The stand 140 supports an idler pulley 141, about which the drive belt 138 also passes. It thus will be apparent that the can bodies B will be fed in timed relation to the feeding of the tube T through the breaking apparatus.

Reference is now made to FIGURE 8, wherein there are shown the details of guide means for holding the can bodies B on the belts 126, 131. These guide means include what will be considered an inside guide assembly, generally referred to by the numeral 142 and disposed adjacent the plate 93, and an outside guide assembly, generally referred to by the numeral 143 and disposed remote from the plate 93.

The inside guide assembly 142 includes a plurality of angle brackets 146 which are spaced along the plate 93 on the left side thereof, as viewed in FIGURE 8, in an arcuate path. Each of the angle brackets 146 includes a vertical leg 147 and a generally horizontal leg 148. The vertical leg 147 is clamped against the plate 93 by a plurality of fasteners 149. Each of the generally horizontal legs 148 is provided with a slot 150 which is elongated generally normal to the plate 93.

Each of the angle brackets 146 has a shaft 151 depending from the leg 148 thereof. The upper portion of each shaft 151 passes through the slot 150 of the respective angle bracket 146 and has an upper threaded portion 152. The upper threaded portion 152 has threaded thereon an upper nut 153 and a lower nut 154. Associated with the nuts 153, 154 are washers 155, 156 which clampingly engage opposite surfaces of the respective leg 148.

A lower collar 157 is secured on the lower part of the shaft 151 by means of a pin 158. A guide roller 160 is mounted on the shaft 151 for rotation, and is seated on the upper surface of the collar 157. The vertical center of the roller 160 is aligned generally with the center of the can body B as it passes the roller 160.

A generally conical roller 161 is mounted on the shaft 151 for rotation and is seated on the roller 160. The configuration of the roller 161 is such that it engages an upper portion of a can body B at it passes thereby so as to prevent both inward and upward movement of the can body. The roller 161 is held against vertical movement by a collar 162 which is retained on the shaft 151 against movement therealong by means of a pin 163.

The exterior guide assembly 143 includes one generally horizontal support bar 164 for each of the angle brackets 146. Each of the support bars 164 is disposed generally normal to the plane of the plate 93 and is secured to the underside of the bar 95 by a plurality of fasteners 165 which pass through the bar 164 and are threaded into the bar 95. The outer portion of each of the bars 164 is provided with a slot 166 which is elongated in a direction normal to the plane of the plate 93.

Each of the bars 164 carries an upstanding shaft 167 which has the lower portion thereof passing through the slot 166. The shaft 167 has a threaded lower portion 168 on which there is adjustably positioned an upper nut 169 and a lower nut 170. Disposed adjacent the nuts 169, 170 are washers 171, 172 which are disposed above and below the bar 164 and are clamped thereagainst.

A lower collar 173 is fixed to the shaft 167 adjacent its midpoint by means of a pin 174. A guide roller 175 is rotatably mounted on the shaft 167 and is seated on the collar 173. The roller 175 is aligned with the roller 160 and is positioned to engage the central portion of the can body B as it passes the roller 175.

A generally conical roller 176 is also rotatably mounted on the shaft 167. The roller 176 is seated on the roller 175 and is intended to engage the upper outer part of the can body so as to prevent both upward and outward movement thereof. Upward movement of the roller 176 is prevented by an upper collar 177 which is retained in place on the shaft 167 by a pin 178.

It is to be understood that the present invention is intended to accommodate can bodies B of different diameters. When it is desired to accommodate can bodies other than that illustrated in FIGURE 8, the guide assemblies 142, 143 may be adjusted to accommodate a different size of can body by shifting the shafts 151 and 167 inwardly or outwardly, as is necessary, and by raising and lowering the shafts 151 and 167, as is necessary. Thus, within limits, the guide assemblies 142, 143 may accommodate a variety of different can bodies.

Figure 7:
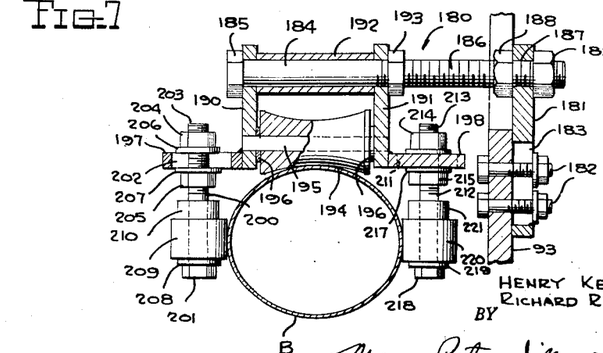
FIGURE 7 is an enlarged fragmentary vertical sectional view, taken along the line 7—7 of FIGURE 4, and shows the specific details of transition rollers for leading can bodies from the can body breaker into the apparatus for severing the connecting tabs.

As is best illustrated in FIGURE 6, as the can body B passes between the rollers 26 and 27, to effect the breaking thereof from the next adjacent can body, it is greatly flattened. Thus, when the can body is presented to the combined feed and guide assembly 94, it is not circular in cross-section. In order to facilitate the smooth transfer of the can body from the rollers 26, 27 to the combined feed and guide assembly 94, there are provided transition guide means, generally referred to by the numeral 180, and best illustrated in FIGURE 7. The transition guide means 180 include a mounting strap 181 which is secured the right surface of the plate 93, as is illustrated in FIGURE 7, by means of a pair of fasteners 182. The fasteners 182 pass through a vertically elongated slot 183 in the lower part of the mounting plate 181 so as to permit vertical adjustment of the mounting plate 181.

An elongated support rod 184 is carried by the upper part of the mounting plate 181 and extends generally normal to the plane of the plate 93. The support rod 184 has a head 185 on the left end thereof, and the right part thereof is provided with threads 186. The right end of the support rod 184 passes through an opening 187 in the upper part of the mounting plate 181 and is clamped to the mounting plate 181 by means of a pair of opposed nuts 188, 189. In this manner, the support rod 184 may be adjusted normal to the plane of the plate 93.

A pair of generally triangular in elevation plates 190, 191 are suspended from the support rod 184 remote from the plate 93. The plate 190 abuts the head 185, a spacer sleeve 192 is disposed between the plates 190, 191, and a nut 193 is threaded on the threaded portion 186 and clamps against the plate 191. As is best shown in FIGURE 4, a pair of rollers 194 are supported by the plates 190, 191. The individual roller 194 is hourglass in configuration, as is best shown in FIGURE 7, and is supported between the plates 190, 191 on a shaft 195 which extends between and is supported by the plates 190, 191. Spacing washers 196 are carried by the shaft 195 between the ends of the roller 194 and corresponding ones of the plates 190, 191.

A generally horizontally disposed plate 197 extends outwardly from the plate 190 at the lower end thereof. A similar plate 198 is carried by the plate 191 adjacent the lower edge thereof. A shaft 200 having a lower head 201 extends through and depends from the plate 197. The plate 197 has a slot 202 which extends generally normal to the plane of the plate 93 through which the upper portion of the shaft 200 extends. The shaft 200 has an upper threaded portion 203 on which there is threadedly positioned an upper nut 204 and a lower nut 205. Washers 206 and 207 are associated with the nuts 204 and 205, respectively, and engage upper and lower surfaces of the plate 197 to vertically position the shaft 200 with respect to the plate 197.

A washer 208 overlies the head 201 and a guide roller 209 is carried by the shaft 200 for rotation with the guide roller 209 being seated on the washer 208. A collar 210 is secured to the shaft 200 above the roller 209 to prevent vertical movement of the roller 209.

The plate 198 also has a slot 211 therethrough. The slot 211 corresponds to the slot 202 and extends generally normal to the plane of the plate 93. A shaft 212 depends from the plate 198 and has a threaded upper portion 213 which extends through the slot 211. An upper nut 214 and a lower nut 215 are threaded on the upper portion 213. Washers 216 and 217 are associated with the nuts 214 and 215, respectively, and clampingly engage opposite surfaces of the plate 198 to vertically position the shaft 212.

The shaft 212 terminates at its lower end in a head 218. A washer carried by the shaft 212 rests upon the head 218, the washer being referred to by the numeral 219. A guide roller 220 rotatably journaled on the shaft 212 is seated on the washer 219. A collar 221, which is fixedly secured to the shaft 212, prevents upward movement of the guide roller 220.

It is to be noted that the guide rollers 209, 220 are arranged in sets and in opposed vertical alignment. Further, the guide rollers 209, 220 are vertically positioned to engage the vertical median point of can bodies B passing therebetween. The rollers 194 are positioned to engage the upper surfaces of the can bodies B. In this manner, the relatively flattened can bodies may be guided onto the feed belts 126, 131 and between the guide rollers 160, 161, 175, 176.

It is to be understood that the rollers 194 may be vertically adjusted to accommodate different diameter can bodies by vertically adjusting the mounting plate 181. Further, when the mounting plate 181 is vertically adjusted, the guide rollers 209, 220 may be vertically adjusted by adjusting the positions of the shafts 200 and 212 relative to the plates 197 and 198, respectively.

The means for breaking off the connecting tabs remaining betwen adjacent can bodies B after adjacent can bodies have been broken apart include a tubular conductor 222 which is arcuate in elevation, as is best illustrated in FIGURES 1 and 4. The conductor 222 is supported adjacent opposite ends thereof by clamp blocks 223, which clamp blocks are formed in pairs and are formed of an insulating material. Each pair of clamp blocks is carried by a support bracket 224 which is vertically adjustably secured to the plate 93 by a pair of fasteners 225 extending through elongated slots 226 in the plate 93. In this manner, the conductor 222 may be vertically adjusted to vary its spacing above the belts 126, 131, to thereby accommodate can bodies of various diameters.

Figure 2:
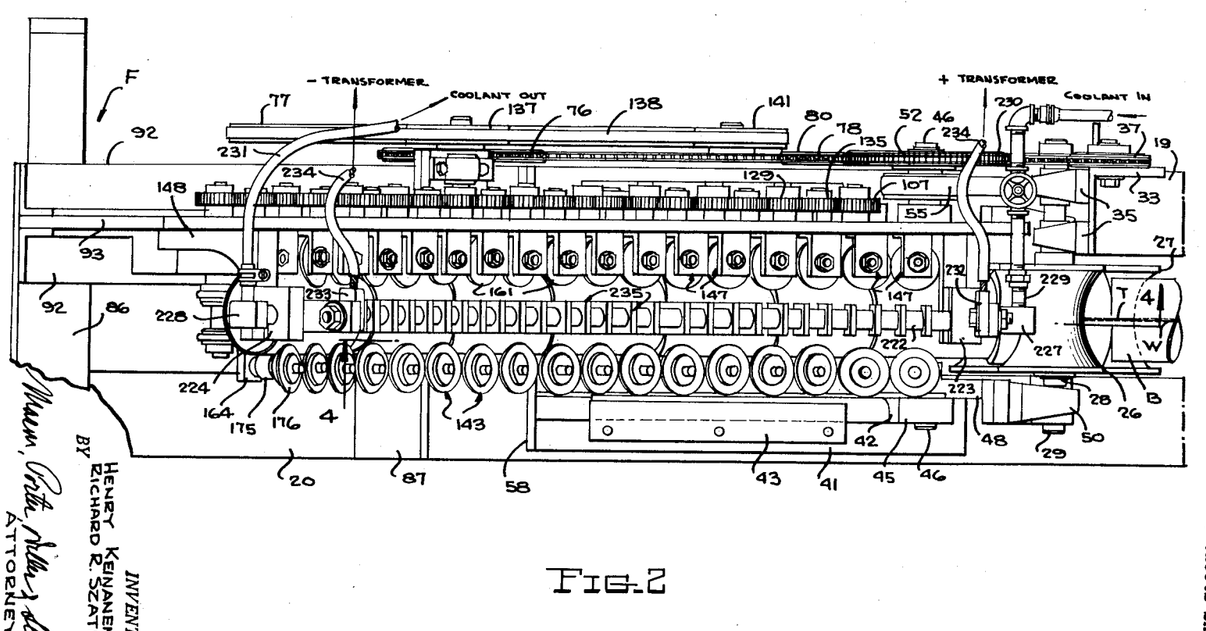
FIGURE 2 is a top plan view of the apparatus of FIGURE 1, with the details of the tube guide being omitted, the view being on a larger scale than FIGURE 1.

The lower end of the conductor 222, as illustrated in FIGURE 1, is provided with a water inlet fitting 227, and the upper end thereof is provided with a water outlet fitting 228. A water supply pipe 229, as is best illustrated in FIGURE 2, is connected to the water inlet fitting 227, and has incorporated therein a flow control valve 230. A water return line 231 is connected to the water outlet fitting 228. Thus, water or other coolant may flow through the conductor 222 to effect the cooling thereof.

A first connector 232 is connected to the conductor 222 adjacent the water inlet fitting 227. A second connector 233 is connected to the conductor 222 adjacent the clamp blocks 223 which are disposed adjacent the water outlet fitting 228. Suitable electrical lines 234 connect a power supply (not shown) to the connectors 232, 233.

A plurality of contacting electrodes 235 are secured to the conductor 222 at closely spaced intervals. Each of the contacting electrodes 235 includes a mounting block 236 which is electrically connected to the conductor 222 by brazing, silver solder, etc., with the conductor 222 passing therethrough. A brush unit 237 is secured to a lower portion of each of the mounting blocks by means of a suitable fastener 238. Each brush unit 237 is formed of a plurality of thin resilient metallic strips, and thus is relatively resilient so that it will remain in contact with a can body B as is passes along the predetermined path defined by the feed and guide assembly 94.

*Operation*

The tube T, as aforementioned, is provided at intervals with slit or score lines S to divide it into can body lengths. As the tube T passes through the tube guides 15, 16 (see FIGURE 1), it is held rigidly for movement along its longitudinal axis. However, as the tube T strikes the lower breaker roller 27 and rides up thereover, the tube T is diverted from its line of travel, with the result that the tube T breaks along the score line S remote from the welded seam W. This breaking apart of the tube along the score line S is greatly facilitated by the subsequent squeezing of the partially broken away section of the tube T as is passes between the breaker rollers 26 and 27, as is best shown in FIGURE 6. After the tube T passes between the breaker rollers 26, 27, it emerges as a plurality of can bodies B connected together by the connecting tabs t which extend generally coextensive with the welded seam W, the breaking apart of the can bodies being restricted by the welded seam.

The interconnected can bodies B in their partially flattened state, then pass through the transition guide means 189 before entering into the combined feed and guide assembly 94. When the can bodies B enter into the combined feed and guide assembly 94, due to their resiliency, they will have substantially returned to their original circular cross-section.

As the connected together can bodies B move into the combined feed and guide assembly 94, they are engaged by the belts 126, 131 and are moved along the predetermined upwardly curving arcuate path defined by the combined feed and guide assembly 94. At the same time, the can bodies B and the connecting tabs t extending therebetween are engaged along the welded seam W by the brush units 237 of the contacting electrodes 235.

The connecting tabs t bridge adjacent pairs of contacting electrodes 235 and together therewith form shunted circuits. As a result, the connecting tabs t are progressively heated as they pass beneath the conductor 222. At the same time, the connecting tabs t are placed under tension due to the progressive increase in the speed of driving the belts 126, 131. When the connecting tabs t have been heated to the necessary temperature, they will pull apart to thus permit the separation of the can bodies B.

At this time, it is pointed out that since the can bodies B pass along an arcuate path, the can bodies are separated from each other except by being connected together by the connecting tabs t. As the connecting tabs t are severed, due to the progressively increasing rate of feed of the belts 126, 131, the separated can bodies B are moved away from each other to prevent them from again coming into contact with each other and the resulting arcing therebetween.

In the example apparatus built, the transformer which is connected to the conductor 222 is a 20 kva. transformer, with the output voltage being approximately 10 volts. This has provided sufficient current to separate can bodies at linear feed rates of 300 feet per minute and above, and will be sufficient for feed rates up to 2000 feet per minute. Of course, it is possible to increase this feed rate utilizing other types of electrical power source other than the transformer described above.

The conductor 222 is in the form of a stainless steel tube, and has a resistance of 3 milliohms per foot. The contacting electrodes in the example apparatus were spaced 0.875 inch apart, with the result that the resistance of the conductor 222 between adjacent contacting electrodes 235 is approximately 165 microhms. The resistance of each of the contacting electrodes, including the contact resistance between a brush unit and a can body, is 600 microhms. The resistance of a can body between contacting electrodes is 200 microhms. The resistance of a connecting tab t, when cold, is approximately 800 microhms, and this resistance increases to approximately 4,000 microhms at a temperature of 1,500 degrees F. It will thus be apparent that due to the nature of the shunted circuit formed by the contacting electrodes 235 and either portions of can bodies or connecting tabs is of a nature that the major portion of the current flows through the conductor 222 and only a small proportion of the current flows through the can bodies and connecting tabs. Furthermore, it will be apparent that since the resistance of a connecting tab increases as the temperature thereof rises, as the connecting tab becomes heated, the current passing therethrough will decrease so that at the time the connecting tab t is pulled apart, the current passing therethrough will be too low to result in arcing and the undesired burning away of the end of the can body inwardly of the end extremity thereof.

It is to be understood that the connecting tab t will vary in width depending upon the conditions of the seam weld and the breaking apart of the can bodies. However, since the connecting tabs are progressively heated as they are sequentially moved from one brush bridging position to another, it will be seen that connecting tabs are only sufficiently heated to be pulled apart irrespective of their widths. It will be apparent that a very narrow connecting tab may pass only a few of the contacting electrodes 235 until it is sufficiently heated to be pulled apart, whereas a relatively wide connecting tab may bridge numerous of the contacting electrodes before it is sufficiently heated to be pulled apart.

After the can bodies B are separated, they will be fed along the predetermined path of the combined feed and guide assembly 94 and then discharged from the apparatus. The can bodies may be collected in any desired manner.

Figure 12:
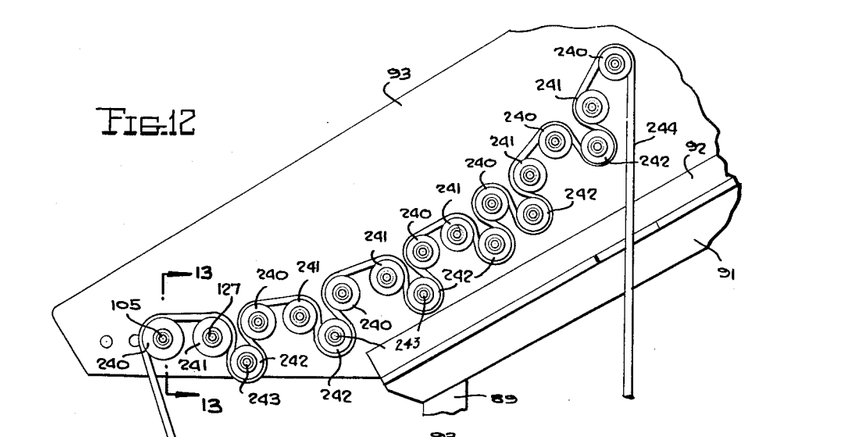
FIGURE 12 is a fragmentary elevational view, showing a modified form of drive for the feed belts.
Figure 13:
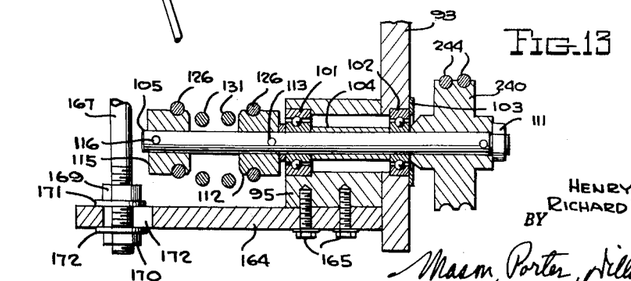
FIGURE 13 is a fragmentary enlarged vertical sectional view, taken along the line 13—13 of FIGURE 12, and shows further the details of the modified form of drive for the feed belts.

Reference is now made to FIGURES 12 and 13 of the drawings, wherein a modified form of drive for the shafts 105, 127, which, in turn, drive the drive belts 126, 131, is illustrated. In lieu of the gears 107 and 129, the shafts 105 and 127 are provided with pulleys 240 and 241, respectively. It is to be noted that the pulleys 240, 241 decrease in circumference from left to right, as viewed in FIGURE 12, so that each set of belts 126, 131 are progressively driven faster.

In addition to the pulleys 240, 241, there are a plurality of idler pulleys 242 which are rotatably mounted on stub shafts 243 suitably carried by the plate 93. The idler pulleys 242 are disposed generally below the pulleys 240, 241, and are so spaced with respect to the pulleys 240, 241, that drive belts 244 pass over two of the pulleys 240, 241 and then down under one of the pulleys 242. The arrangement is clearly illustrated in FIGURE 12.

Each of the pulleys 240, 241, 242 is provided with double grooves and there are two drive belts 244. The drive belts 244 will be entrained over the pulleys 77 and 141 in the manner generally shown in FIGURE 3.

From the foregoing, it will be seen that novel and advantageous provision has been made for carrying out the desired end. However, attention is directed to the fact that variations may be made in the example method and apparatus disclosed herein without departing from the spirit and scope of the invention, as defined in the appended claims.

What is claimed as new:

1. An apparatus for electrically separating can bodies and like tubular members connected together by tabs disposed in alignment, said apparatus comprising a plurality of feed units disposed in alignment for feeding both connected and individual tubular members, drive means connected to said feed units for constantly driving said feed units with the feed units progressively increasing in linear speed from one feed unit to the next whereby tabs interconnecting adjacent tubular members are tensioned and separated tubular members are advanced away from each other, contacting electrodes disposed along said feed units in spaced aligned relation whereby individual ones of the tabs may be disposed between said contacting electrodes in bridging relation, and means for supplying electrical energy to said contacting electrodes to be passed through individual tabs to heat and burn away the tabs.

2. The apparatus of claim 1 wherein said feed unit is disposed in an arcuate path with the path of the tabs being of a lesser radius than the radius of a path of any other portion of each tubular member whereby ends of adjacent interconnected tubular members are separated with the exception of the tabs extending therebetween.

3. An apparatus for electrically separating can bodies and like tubular members connected together by tabs with adjacent tabs being in alignment longitudinally of the tubular members, said apparatus comprising means for feeding and guiding the tubular members along a predetermined path, and electrical tab burn-off means in the form of a plurality of contacting electrodes in excess of two spaced along said path for engagement by moving tubular members, and means for supplying electrical engery simultaneously to all of said contacting electrodes to be passed through individual tabs to progressively heat the tabs until a burning away of the tabs is effected.

4. The apparatus of claim 3 wherein the spacing between said contacting electrodes is greater than the lengths of the tabs whereby the tabs momentarily bridge adjacent contacting electrodes.

5. The apparatus of claim 3 wherein the spacing between said contacting electrodes is greater than the lengths of the tabs whereby the tabs momentarily bridge adjacent contacting electrodes, and the spacing between adjacent contacting electrodes is less than the spacing between tabs to effect a by-passing of current and a reduction of current flow through the tab as the temperature and resistance thereof increases.

6. The apparatus of claim 3 wherein the path defined by said feeding and guiding means is arcuate and the path followed by said tabs is of a lesser radius than the radius of a path of any other portion of each tubular member whereby ends of adjacent interconnected tubular members are separated with the exception of the tabs extending therebetween.

7. An apparatus for electrically separating can bodies and like tubular members connected together by tabs with adjacent tabs being in alignment longitudinally of the tubular members, said apparatus comprising means for feeding and guiding the tubular members along a predetermined path, and electrical tab burn-off means in the form of an elongated conductor having a plurality of contacting electrodes electrically connected thereto and projecting therefrom along said predetermined path for engagement by moving tubular members to form shunted circuits through the tubular members and connecting tabs therebetween, and means for supplying electrical energy to said contacting electrodes to be passed through individual tabs to progressively heat the tabs until a burning away of the tabs is effected.

8. An apparatus for electrically separating can bodies and like tubular members connected together by tabs with adjacent tabs being in alignment longitudinally of the tubular members, said apparatus comprising means for feeding and guiding the tubular members along a predetermind path, and electrical tab burn-off means in the form of an elongated conductor having a plurality of contacting electrodes electrically connected thereto and projecting therefrom along said predetermined path for engagement by moving tubular members to form shunted circuits through the tubular members and connecting tabs therebetween, and means for supplying electrical energy to said contacting electrodes to be passed through individual tabs to progressively heat the tabs until a burning away of the tabs is effected, the combined resistance of two of said contacting electrodes and a portion of a tubular member bridging therebetween being much greater than the resistance of a section of said conductor between two of said contacting electrodes whereby a major portion of the current flow is through said conductor.

9. The apparatus of claim 8 wherein said conductor is tubular and is cooled by a coolant flowing therethrough.

10. An apparatus for electrically separating can bodies and like tubular members connected together by tabs with adjacent tabs being in alignment longitudinally of the tubular members, said apparatus comprising means for feeding and guiding the tubular members along a predetermined path, and electrical tab burn-off means in the form of an elongated conductor having a plurality of contacting electrodes electrically connected thereto and projecting therefrom along said predetermined path for engagement by moving tubular members to form shunted circuits through the tubular members and connecting tabs therebetween, and means for supplying electrical energy to said contacting electrodes to be passed through individual tabs to progressively heat the tabs until a burning away of the tabs is effected, each contacting electrode having a brush portion formed of a plurality of thin strips of flexible and resilient conductive material.

11. An apparatus for electrically separating can bodies and like tubular members connected together by tabs with adjacent tabs being in alignment longitudinally of the tubular members, said apparatus comprising means for feeding and guiding the tubular members along a predetermined path, and electrical tab burn-off means in the form of a plurality of contacting electrodes in excess of two spaced along said path for engagement by moving tubular members, and means for supplying electrical energy to said contacting electrodes to be passed through individual tabs to progressively heat the tabs until a burning away of the tabs is effected, said feeding and guiding means including a first set of drive belts disposed in end-to-end spaced relation, a second set of drive belts disposed in end-to-end relation with the drive belts of said second set extending between and overlapping the drive belts of said first set, guide rollers cooperating with said first and second sets of said drive belts for retaining tubular members on said drive belts, and means for driving said belts progressively faster from the first to the last to tension the tabs and advance separated tubular members away from each other.

12. The apparatus of claim 11 wherein the drive belts of each of said sets are disposed in pairs with the drive belts of said first set being widely spaced and the drive belts of said second set being narrowly spaced so that drive belts of both of said sets may simultaneously engage a tubular member.

13. The apparatus of claim 11 wherein said guide rollers include pairs of opposed rollers for engaging a tubular member on opposite sides of the vertical center line thereof and at midheight, and pairs of rollers for engaging upper portions of a tubular member on opposite sides of the vertical center line thereof.

14. The apparatus of claim 13 wherein said rollers are mounted on shafts and said shafts have adjustable mounting means facilitating adjustment of said rollers to accommodate tubular members of different diameters.

15. The apparatus of claim 13 wherein said rollers are mounted on shafts with each of said shafts supporting one of the first-mentioned rollers and one of the second-mentioned rollers.

16. An apparatus for separating a tube into separate can bodies and like tubular members wherein the tube has a welded seam and is weakened along transversely disposed circumferential lines at longitudinal spaced intervals, the apparatus comprising a series of guides for maintaining the movement of the tube to a path along its longitudinal axis, and a pair of rollers displaced from the longitudinal axis of the tube in the direction of the welded seam to initiate breaking of the tube along each line of weakening remote from the welded seam, and the spacing between said pair of rollers being less than the diameter of the tube whereby the tube is flattened as it passes between said pair of rollers to further break the tube along each line of weakening to separate the tube into individual tubular members interconnected by connecting tabs coextensive with the welded seam, and means for severing the connecting tabs.

17. An apparatus for separating a tube into separate can bodies and like tubular members wherein the tube has a welded seam and is weakened along transversely disposed circumferential lines at longitudinally spaced intervals, the apparatus comprising a series of guides for maintaining the movement of the tube to a path along its longitudinal axis, and a pair of rollers displaced from the longitudinal axis of the tube in the direction of the welded seam to initiate breaking of the tube along each line of weakening remote from the welded seam, and the spacing between said pair of rollers being less than the diameter of the tube whereby the tube is flattened as it passes between said pair of rollers to further break the tube along each line of weakening to separate the tube into individual tubular members interconnected by connecting tabs coextensive with the welded seam, and means for severing the connecting tabs, said means for severing the connecting tabs including means for feeding and guiding the tubular members along a predetermined path, and electrical tab burn-off means in the form of a plurality of contacting electrodes in excess of two spaced along said path for engagement by moving tubular members, and means for supplying electrical energy to said contacting electrodes to be passed through individual tabs to progressively heat the tabs until a burning away of the tabs is effected.

18. An apparatus for separating a tube into separate can bodies and like tubular members wherein the tube has a welded seam and is weakened along transversely disposed circumferential lines at longitudinally spaced intervals, the apparatus comprising a series of guides for maintaining the movement of the tube to a path along its longitudinal axis, and a pair of rollers displaced from the longitudinal axis of the tube in the direction of the welded seam to initiate breaking of the tube along each line of weakening remote from the welded seam, and the spacing between said pair of rollers being less than the diameter of the tube whereby the tube is flattened as it passes between said pair of rollers to further break the tube along each line of weakening to separate the tube into individual tubular members interconnected by connecting tabs coextensive with the welded seam, and means for severing the connecting tabs, said means for severing the connecting tabs including a plurality of feed units displosed in alignment for feeding both connected and individual tubular members, drive means connected to said feed units for constantly driving said feed units with the feed units progressively increasing in linear speed from one feed unit to the next whereby tabs interconnecting adjacent tubular members are tensioned and separated tubular members are advanced away from each other, contacting electrodes disposed along said feed units in spaced aligned relation whereby individual ones of the tabs may be disposed between said contacting electrodes in bridging relation, and means for supplying electrical energy to said contacting electrodes to be passed through individual tabs to heat and burn away the tabs.

19. An apparatus for separating a tube into separate can bodies and like tubular members wherein the tube has a welded seam and is weakened along transversely disposed circumferential lines at longitudinally spaced intervals, the apparatus comprising a series of guides for maintaining the movement of the tube to a path along its longitudinal axis, and a pair of rollers displaced from the longitudinal axis of the tube in the direction of the welded seam to initiate breaking of the tube along each line of weakening remote from the welded seam, and the spacing between said pair of rollers being less than the diameter of the tube whereby the tube is flattened as it passes between said pair of rollers to further break the tube along each line of weakening to separate the tube into individual tubular members interconnected by connecting tabs coextensive with the welded seam, means for longitudinally and transversely adjusting the positions of each roller of said pair of rollers, and means for severing the connecting tabs.

20. An apparatus for separating a tube into separate can bodies and like tubular members wherein the tube has a welded seam and is weakened along transversely disposed circumferential lines at longitudinally spaced intervals, the apparatus comprising a series of guides for maintaining the movement of the tube to a path along its longitudinal axis, and a pair of rollers displaced from the longitudinal axis of the tube in the direction of the welded seam to initiate breaking of the tube along each line of weakening remote from the welded seam, and the spacing between said pair of rollers being less than the diameter of the tube whereby the tube is flattened as it passes between said pair of rollers to further break the tube along each line of weakening to separate the tube into individual tubular members interconnected by connecting tabs coextensive with the welded seam.

21. An apparatus for separating a tube into separate can bodies and like tubular members wherein the tube has a welded seam and is weakened along transversely disposed circumferential lines at longitudinally spaced intervals, the apparatus comprising a series of guides for maintaining the movement of the tube to a path along its longitudinal axis, and a pair of rollers displaced from the longitudinal axis of the tube in the direction of the welded seam to initiate breaking of the tube along each line of weakening remote from the welded seam, and the spacing between said pair of rollers being less than the diameter of the tube whereby the tube is flattened as it passes between said pair of rollers to further break the tube along each line of weakening to separate the tube into individual tubular members interconnected by connecting tabs coextensive with the welded seam, means for longitudinally and transversely adjusting the positions of each roller of said pair of rollers.

22. An apparatus for separating a tube into separate can bodies and like tubular members wherein the tube has a welded seam and is weakened along transversely disposed circumferential lines at longitudinally spaced intervals, the apparatus comprising a series of guides for maintaining the movement of the tube to a path along its longitudinal axis, and a pair of rollers displaced from the longitudinal axis of the tube in the direction of the welded seam to initiate breaking of the tube along each line of weakening remote from the welded seam, and the spacing between said pair of rollers being less than the diameter of the tubes whereby the tube is flattened as it passes between said pair of rollers to further break the tube along each line of weakening to separate the tube into individual tubular members interconnected by connecting tabs coextensive with the welded seam, and means for severing the connecting tabs, said means for severing the connecting tabs including means for feeding and guiding the tubular members along a predetermined path, and electrical tab burn-off means in the form of a plurality of contacting electrodes in excess of two spaced along said path for engagement by moving tubular members, and means for supplying electrical energy to said contacting electrodes to be passed through individual tabs to progressively heat the tabs until a burning away of the tabs is effected, said feeding and guiding means including a first set of drive belts disposed in end-to-end spaced relation, a second set of drive belts disposed in end-to-end spaced relation with the drive belts of said second set extending between and overlapping the drive belts of said first set, guide rollers cooperating with said first and second sets of said drive belts for retaining tubular members on said drive belts, and means for driving said drive belts progressively faster from the first to the last to tension the tabs and advance separated tubular members away from each other, and transition rollers disposed between said pair of rollers and the first of said guide rollers and said drive belts to guide each tubular member as it is returning to its original cross-section from its flattened state.

23. A method of electrically separating can bodies and like tubular members connected together by tabs comprising the steps of repeatedly bridging electrical contacts with each of the tabs to progressively heat each tab and applying a tensile force on each tab to pull apart the heated tabs.

24. A method of electrically separating can bodies and like tubular members connected together by tabs comprising the steps of passing the tubular member through an arcuate path with the path of the connecting tabs being of a lesser radius than the radius of any other portion of the tubular members to separate adjacent tubular members except for the connecting tabs, and while passing the tubular members along the arcuate path repeatedly bridging electrical contacts with each of the tabs to progressively heat each tab and applying a tensile force on each tab to pull apart the heated tabs.

25. A method of electrically separating can bodies and and like tubular members connected together by tabs comprising the steps of repeatedly bridging electrical contacts with the tabe to progressively heat the tabs and applying a tensile force on each tab to pull apart the heated tabs, and advancing each separated tubular member at a progressively increasing rate to retain separated tubular members in spaced relation.

26. A method for separating a tube into individual can bodies and like tubular members wherein the tube has a welded seam and is weakened along transversely disposed circumferential lines at longitudinally spaced intervals, the method comprising the steps of abruptly changing the direction of movement of the tube in a direction towards the welded seam as it is advanced to intially break the tube along each weakened line remote from the welded seam, flattening the tube subsequent to the initial breaking thereof to separate adjacent tubular members with the exception of a connecting tab disposed along the welded seam, repeatedly bridging electrical contacts with each of the tabs to progressively heat each tab and applying a tensile force on each tab to pull apart the heated tabs.

27. A method of separating a longitudinally moving tube into interconnected can bodies and like tubular members wherein the tube has a welded seam and is weakened along transversely disposed circumferential lines at longitudinally spaced intervals, the method comprising the steps of flattening a first section of said tube in a moving series of tubular sections while laterally confining a following section for initially breaking the first tubular member along a transversely disposed circumferential line and separating said first tubular member from the succeeding tubular member with the exception of a connecting tab disposed along the welded seam.

28. A method of separating a longitudinally moving tube into interconnected can bodies and like tubular members wherein the tube has a welded seam and is weakened along transversely disposed circumferential lines at longitudinally spaced intervals, the method comprising the steps of flattening a first section of said tube in a moving series of tubular sections while laterally confining a following section for initially breaking the first tubular member along a transversely disposed circumferential line and separating said first tubular member from the succeeding tubular member with the exception of a connecting tab disposed along the welded seam, and repeatedly bridging electrical contacts with each of the tabs to progressively heat each tab and applying a tensile force on each tab to pull apart the heated tabs.

29. A method of separating a longitudinally moving tube into interconnected can bodies and like tubular members wherein the tube has a welded seam and is weakened along transversely disposed circumferential lines at longitudinally spaced intervals, the method comprising the steps of flattening a first section of said tube in a moving series of tubular sections while laterally confining the following section while simultaneously changing the direction of movement of the tube in the direction of the welded seam as it is advanced for initially breaking the first tubular member along a transversely disposed circumferential line and separating said first tubular member from the succeeding tubular member with the exception of a connecting tab disposed along the welded seam, and repeatedly bridging electrical contacts with each of the tabs to progressively heat each tab and applying a tensile force on each tab to pull apart the heated tabs.

References Cited in the file of this patent

UNITED STATES PATENTS

| | | |
|---|---|---|
| 2,060,561 | Fausset | Nov. 10, 1936 |
| 2,187,740 | Hothersall | Jan. 23, 1940 |
| 2,444,463 | Nordquist | July 6, 1948 |
| 2,621,277 | Brewer | Dec. 9, 1952 |